United States Patent [19]

Henderson

[11] 4,125,456
[45] Nov. 14, 1978

[54] METHOD AND APPARATUS FOR SEPARATING PARTICULATE MATERIALS

[75] Inventor: Eulas W. Henderson, Toledo, Ohio

[73] Assignee: Phillips Petroleum Company, Bartlesville, Okla.

[21] Appl. No.: 780,206

[22] Filed: Mar. 22, 1977

[51] Int. Cl.² .............................................. B07B 7/00
[52] U.S. Cl. .................................... 209/140; 209/138
[58] Field of Search ........................... 209/136–139 R, 209/144, 154, 140–142, 10; 222/195, 194; 23/314

[56] References Cited

U.S. PATENT DOCUMENTS

| | | | |
|---|---|---|---|
| 2,591,043 | 4/1952 | Berndt | 209/144 |
| 2,779,468 | 1/1957 | King et al. | 209/144 |
| 2,963,152 | 12/1960 | Leslie et al. | 209/139 R X |
| 3,308,945 | 3/1967 | Oja | 209/138 X |
| 3,493,350 | 2/1970 | Howard | 23/314 |
| 3,595,437 | 7/1971 | Howard | 222/61 |
| 3,956,106 | 5/1976 | Muck et al. | 209/154 X |

*Primary Examiner*—Frank W. Lutter
*Assistant Examiner*—Ralph J. Hill

[57] ABSTRACT

A method and apparatus is provided for separating heavier particulate material from a mixture of light particulate material, heavy particulate material and gas. The apparatus includes a vessel having an outlet at a lower portion thereof wherein particulate material flows toward the outlet and is contacted by countercurrent flow of gas for uplifting of lighter particles of particulate material. Heavy particulate material and some light particulate material is then collected in a chamber of a valve wherein sequential injections of gas in a lower portion of the chamber further separates light particulate material from the heavy particulate material with the remaining particulate material in the chamber being discharged by sequential operation of the valve.

8 Claims, 4 Drawing Figures

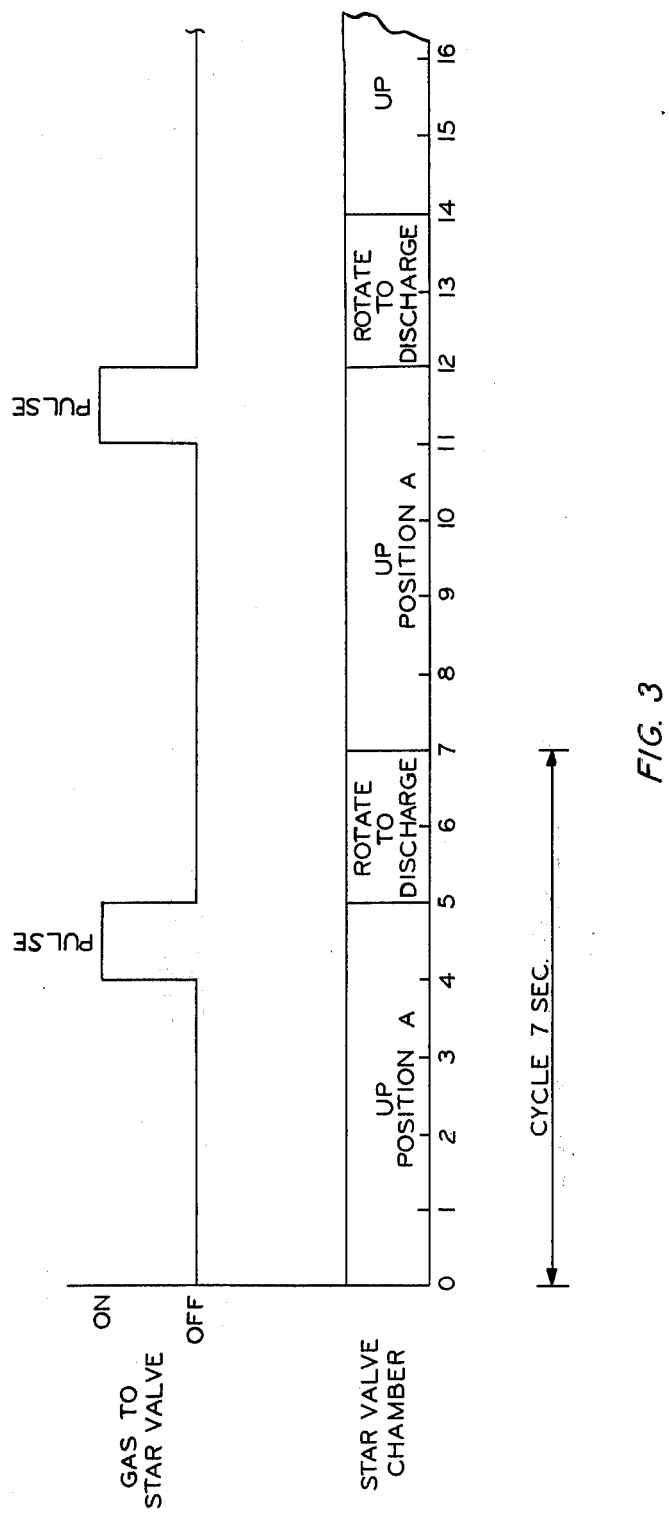

METHOD AND APPARATUS FOR SEPARATING PARTICULATE MATERIALS

In the conveying of particulate material in a stream of gas, particularly in the processing of carbon black, there is oftentimes different weights of particulate material being conveyed with the gas stream. Particularly in carbon black processing, grit is conducted along with the finer, less dense carbon black particulate material, and grit is undesireable as it detracts from the quality of the produced carbon black since one of the quality specifications for carbon black is grit content. Apparatuses are known in the art for separating the grit from the finer carbon black particles, however, such apparatuses discharge excessive amounts of carbon black with the separated grit. The present invention provides an apparatus and method which reduces the amount of the lighter carbon black particles discharged with the separated grit, thereby providing a more efficient operation. Also, this reduces the waste of carbon black which would be discharged with the grit since the discharged particulate material would contain less carbon black.

The principal objects and advantages of the present invention are: to provide a method and apparatus for separating particulate materials; to provide such a method and apparatus which in operation has a reduced amount of lighter particulate material discharged with separated heavier particulate material; and, to provide such a method and apparatus which is well adapted for its intended use.

Other objects and advantages of the present invention will become apparent from the following detailed description taken in connection with the accompanying drawings wherein are set forth by way of illustration and example certain embodiments of the present invention.

FIG. 3 is an operating sequence chart showing the relative timing of various operations of the separating apparatus.

Figures 1, 4:
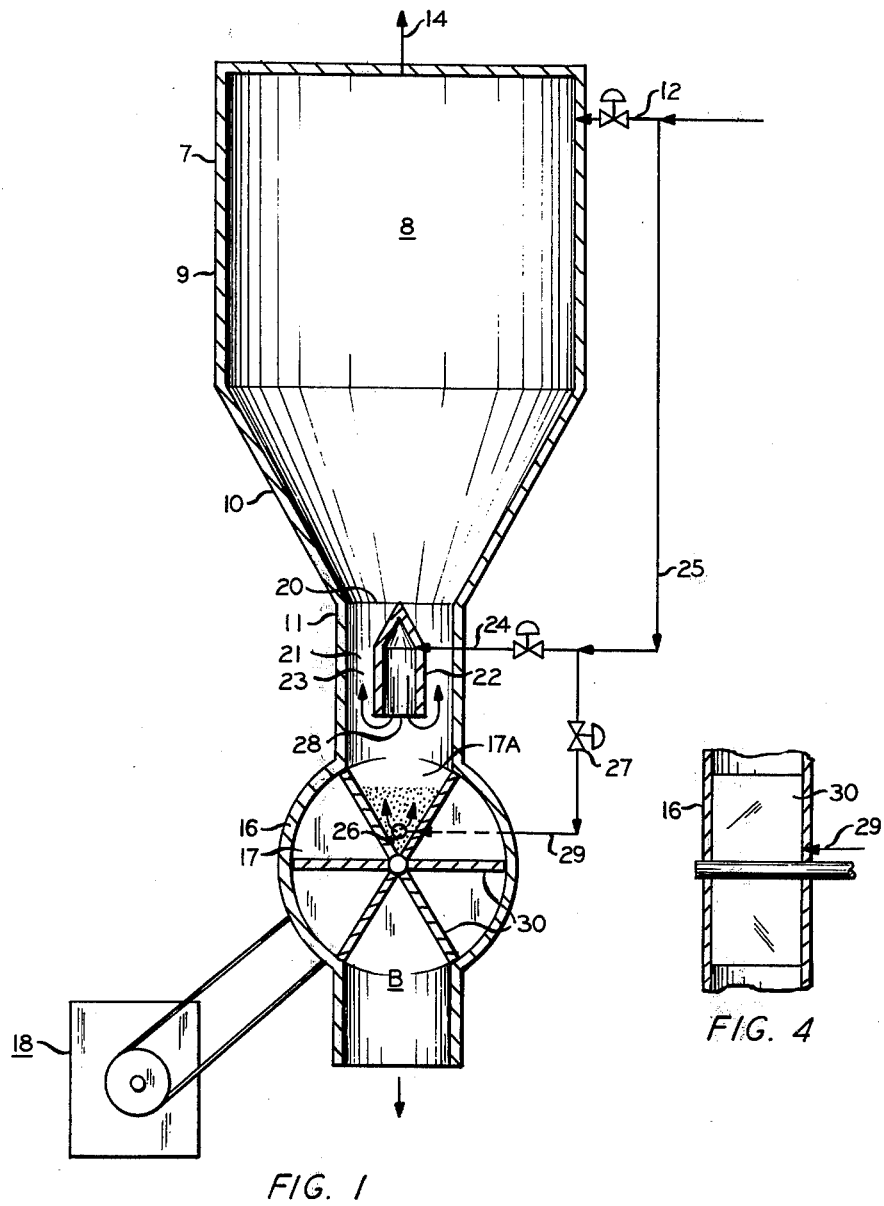
FIG. 1 is a side-elevation sectional view of a separating apparatus.
FIG. 4 is a fragmentary sectional side view of the star valve of FIG. 1.
Figure 2:
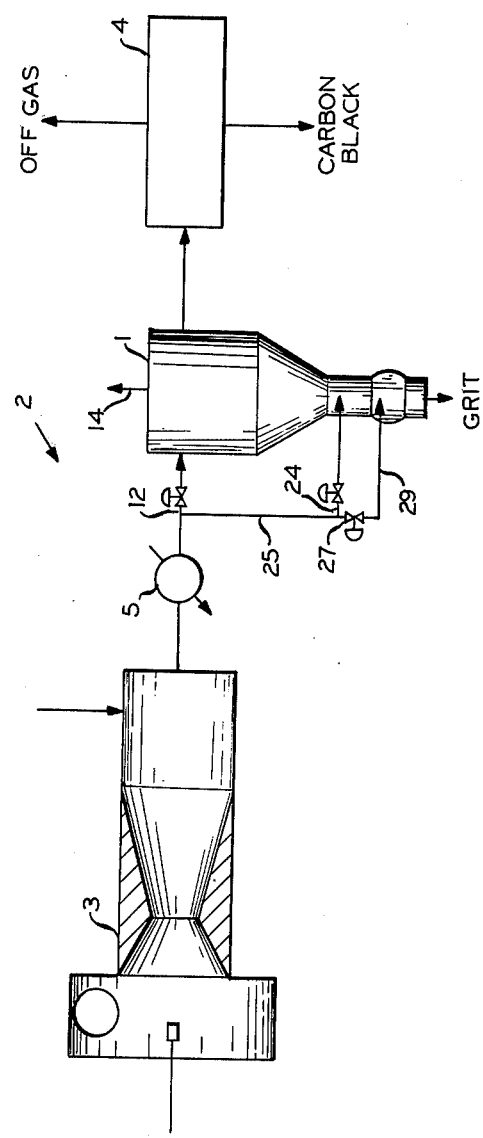
FIG. 2 is a schematic illustration of a carbon black producing apparatus including the separating apparatus of FIG. 1.

Referring more in detail to the drawings:

The reference numeral 1 designates generally an apparatus which is useable for separating heavier particulate material from a mixture of same with the lighter particulate materials, with the particulate materials being conveyed along in a gas stream. This apparatus is particularly applicable for use in a carbon black producing system 2 wherein the apparatus 1 is connected in flow communication between a carbon black reactor 3 and a filter system 4 or can be downstream of the filter 4. The apparatus 1 preferably is positioned downstream of cooling means 5 so that the gas stream containing the particulate material is cooled before entering the apparatus 1.

As shown, the apparatus 1 includes a vessel 7 having a hollow interior 8. The vessel can take any suitable form and preferably has a generally cylindrical upper section 9 with a depending frusto-conical section 10 which converges to a lower portion at which there is positioned an outlet 11. The use of a converging section prevents a stagnant zone for settling of particulate material which would not be discharged through the outlet 11. The vessel is also provided with an inlet 12 which is in flow communication with the reactor 3 so that the effluent, i.e., the gas containing particulate material, is injected into the interior 8 via the inlet 12. It is to be noted that the filter system 4 can be positioned between the reactor 3 and the apparatus 1 instead of being downstream of the apparatus 1. Preferably, the inlet 12 is positioned adjacent an upper end of the vessel 7 and can be directed directly into the interior 8 or can be positioned for tangential introduction of the gas stream into the interior 8. Another outlet 14 opens into the interior 8, preferably adjacent an upper end of the vessel 7 and is operable for allowing discharge of a gas stream containing lighter particulate material and gas therefrom with a reduced grit concentration, i.e., heavier particulate material. "Grit" is a known term in the art of carbon black production and both carbonaceous or coke-type and ceramic-type particles make up "grit". "Grit" is that material which does not pass through U.S. Sieve 325, in accordance with ASTM D-1514. In the outlet 11 there is provided valve means 16 which is operable for selectively allowing discharge of collected heavier particulate material which will contain a small amount of lighter particulate material from the vessel 7. Any suitable valve means can be used but it is preferred that same be a star valve which forms at least one chamber 17 and preferably a plurality of collecting chambers 17. Star valves are well known in the art and need not be described in detail herein. Drive means 18 is operably connected to the valve 16 for rotating same to move the chambers from a collecting position, i.e., generally upwardly facing or directed, to a discharge position which is downwardly directed as denoted by positions A and B, respectively. As shown, the chambers 17 are generally triangularly shaped, in cross section, having the wide end as the open end and the apex of the baffles forming the chambers 17 located at approximately the axis of rotation thereof as the closed end. In position A, the apex is at the lower end or bottom of the chamber 17. Preferably, the drive means 18 is of a sequential operation type as is known in the art as, for example, same can include a geneva drive mechanism or stepping motor or the like to effect sequential movement of the valve means 16. Positioned between the valve means 16 and the entrance 20 to the outlet 11, that is between the vessel 7 and the valve means 16, there is provided means for forming an elutriation zone portion 21 which cooperates with the upwardly facing chamber 17A to form an elutriation zone. The elutriation zone 21 includes an outlet or discharge member 22 which preferably is directed generally toward the upwardly facing chamber 17A and preferably is generally centrally located within the outlet 11 forming an annular flow path 23 therein. A conduit 24 connects the discharge member 22 to a source of gas whereby gas flows into the discharge member out the open end 28 thereof and upwardly through the flow path 23 into the interior 8 of the vessel 7. This is countercurrent to the flow of particulate material settling in the bottom portion of the vessel 7 for discharge through the outlet 11. The introduction of gas through the discharge member 22 effects uplifting of the lighter particulate material so that same will be discharged through the outlet 14 instead of through the valve means 16 thereby reducing the content of finer particulate material discharged with the heavier particulate material. Preferably, the flow of gas through the discharge member 22 is continuous. The source of gas for the discharge member 22 can be gas from the stream which flows into the vessel 7 from the reactor 3 wherein a conduit 25 connects the inlet 12 to the conduit 24. Or, the gas can be that used to convey the carbon black from the filter if the apparatus is downstream of the filter 4. If desired, pump means (not shown) can be connected to the conduit 25 to pressure the fluid stream therein to assure adequate flow.

There is provided another inlet 26 which opens into a lower portion of the upwardly facing chamber 17A, i.e., adjacent the apex of the baffles 30 forming the chamber 17A wherein the inlet 26 is connected to a source of gas by a conduit 29. The source of gas preferably is the same as that supplied to the discharge member 22 wherein the conduit 29 would be connected to the conduit 25. Means is connected in the conduit 29 such as a time controlled on/off valve 27 which is operable for timing a pulse of gas to the inlet 26 so that there is sequentially supplied to the chamber 17A a pulse of gas. This allows time for the particulate material, i.e., containing both heavy and light particulate materials, to settle in the chamber 17A for collection therein when valve 27 is closed and no gas is pulsed, and wherein, after a predetermined time, the valve means 27 is actuated so that gas is injected into the bottom of the chamber 17A wherein lighter particulate material is uplifted out of the chamber 17A while the grit remains in the chamber 17A. The valve 27 is timed relative to the sequential operation of the valve 16 as shown in FIG. 3. The pulse of gas is injected just prior to rotation of the valve 16 and the pulse of gas is ceased just as the valve 16 starts to rotate. The valve 16 is sequentially rotated until the chamber 17 containing grit reaches position B at which point the grit is discharged.

FIG. 3 shows an exemplary operation which would operate on a 7-second cycle; however, it is to be understood that any suitable time cycle can be used and that the cycle shown in FIG. 3 is only for purposes of illustration of the operation of the apparatus 1. In this operation, a pulse of gas would be injected between the 4-second and 5-second time intervals, i.e., the pulse of gas would be one second and would cease as the valve is rotated sequentially one step to move another chamber 17 to a collecting position A. In order to illustrate operation of the present invention, the following "calculated" comparative example is provided:

EXAMPLE

| | U.S. Pat. No. 3,956,106 | Invention |
|---|---|---|
| Smoke to Inlet 12: | | |
| SCF/hr | 56,000 (1600 m³/hr) | 56,000 (1600 m³/hr) |
| Carbon Black, lbs/hr. | 727.5 (330 kg/hr) | 727.5 (330 kg/hr) |
| Grit[(a)], lbs/hr. | 0.437 (0.20 kg/hr) | 0.437 (0.20 kg/hr) |
| Constant Flow of Gas (line 24): | | |
| SCF/hr | 1,000 (28.3 m³/hr) | 740 (21 m³/hr) |
| Cyclic Flow of Gas (line 29): | | |
| SCF/hr[(b)] | Not Done (0) | 260 (7.3 m³/hr) |
| Grit Removal[(a)]: | | |
| Grit, lbs/hr. | 0.368 (.17 kg/hr) | 0.368 (0.17 kg/hr) |
| Carbon Black[(b)], lbs/hr. | 36.4 (16.6 kg/hr) | 7.3 (3.3 Kg/hr.) |

[(a)]Grit, as determined by ASTM D-1514.
[(b)]The star valve 16 has the chamber 17A opening upwardly for 5 seconds (time 0 thru 5). Then the valve moves to the next position which takes about 2 seconds (time end of 5 seconds thru 7). During the time period between 4 seconds and 5 seconds, i.e., for about 1 second, fluid is added via inlet 26. For same total grit removal, invention removes only 7.3 pounds/hr of carbon black, a savings of 80 percent of lost carbon black in grit as compared with U.S. Pat. No. 3,956,106, which loses 36.4 pounds of carbon black per hour with the grit removed.

The above example was based on values given in U.S. Pat. No. 3,956,106 at columns 5 and 6. The patent shows the production of 330 kg/hr. of carbon black or 727.5 lbs/hr. which has a grit content before separation of 0.06 weight percent or a feed rate of about 0.437 lbs/hr. After the use of the separator as disclosed in the subject patent, the final grit content is 0.01 weight percent in the overhead carbon black. This is approximately 0.069 lbs/hr. of grit. The following tabulation is based upon the assumption that 95 percent of the carbon black entering the separator is removed as an overhead product by the introduction of 1,000 standard cubic feet of gas per hour via line 24 of applicant's structure.

Table I

| | Feed (Line 12) | Overhead (Line 14) | Bottoms (Outlet 11) |
|---|---|---|---|
| Carbon Black, lbs/hr. | 727.5 | 691.1 | 36.4 |
| Grit, lb/hr. | 0.437 | 0.069 | 0.368 |
| Grit, Wt. % | 0.06 | 0.01 | 1.01 |

By use of the invention as disclosed herein and based upon the above values, the following tabulation is provided: 1,000 standard cubic feet of gas per hour is supplied of which 740 standard cubic feet per hour is supplied through line 24 and 260 standard cubic feet per hour is supplied through the line 29. The following tabulation is based on the assumption that 80 percent of the carbon black fed to the outlet 11 for collection in the valve is returned to the vessel due to the additional sequential injection of gas via the line 29.

Table II

| | Feed Material Passing to Star Valve 16 | Material Elutriated From Valve 16 | Material Disch. Thru Valve 16 |
|---|---|---|---|
| Carbon Black, lbs/hr. | 36.4 | 29.1[(a)] | 7.3[(a)] |
| Grit, lbs/hr. | 0.368 | 0.002[(a)] | 0.366[(a)] |
| Grit, Wt. % | 1.01 | 0.07[(a)] | 5[(a)] |

[(a)]approximate values.

Based upon the values immediately above, the following final products are realized from the two processes:

Table III

| | U.S. Pat. No. 3,956,106 | Invention |
|---|---|---|
| Carbon Black recovered Thru line 14, lbs./hr. | 691.1 | 720.2[(a)] |
| Grit Disch. w/Carbon Black Thru line 14, lbs./hr. | 0.069 | 0.07[(a)] |
| Grit, Wt. % | 0.01 | 0.01[(a)] |

[(a)]approximate values.

It is to be understood that while there has been illustrated and described certain forms of this invention, it is not to be limited to the specific form or arrangement of parts herein described and shown except to the extent that such limitations are found in the claims.

What is claimed and desired to be secured by Letters Patent is:

1. An apparatus for separating particulate materials, said apparatus including:
   (a) a vessel having a first inlet and first and second outlets communicating with the interior of said vessel, said second outlet being positioned adjacent a bottom portion of the vessel, said first inlet being operable for introducing a mixture of gas and particulate material from a first source into the vessel interior and said first outlet being operable for discharge of a portion of the mixture from the vessel;

(b) valve means communicating with said second outlet and operable for selectively allowing collection of particulate material discharged from the second outlet, said valve means forming at least one generally upwardly opening chamber selectively communicating with the second outlet for selectively collecting particulate material for a first predetermined time period;

(c) second inlet means connected to a source of gas and opening into a lower disposed portion of said chamber and operable for introducing a gas into said lower disposed portion;

(d) first means connecting said second inlet means to a source of gas, said first means including means for sequentially allowing gas to flow into said chamber for effecting sequential uplifting of certain particulate material contained in the chamber for a second predetermined time period during a latter portion of the first predetermined time period, said first means and valve means being timed for operation relative to one another whereby said valve means effects discharge of collected particulate material immediately after the second predetermined time period;

(e) third inlet means opening into said second outlet between said vessel and said valve means forming an elutriation chamber portion, said third inlet means being connected to a source of gas.

2. An apparatus as set forth in claim 1 wherein:
(a) said valve means includes a star valve rotatably mounted in said outlet; and including
(b) drive means operably connected to said star valve for selectively rotating said star valve.

3. An apparatus as set forth in claim 2 wherein:
(a) said third inlet means includes a discharge member positioned in said second outlet between the vessel and valve means and spaced from an interior surface of the second outlet defining a flow path therebetween, said discharge member having open an outlet end directed generally toward said valve means, said third inlet means further includes a conduit means connecting the discharge member to a source of gas.

4. An apparatus as set forth in claim 3 wherein:
(a) said first inlet and first outlet open into said vessel interior adjacent an upper portion of the vessel.

5. An apparatus as set forth in claim 3 wherein:
(a) said source of gas for said second and third inlet means includes said first source.

6. An apparatus as set forth in claim 3 wherein:
said drive means is operable for selectively rotating said star valve after the first predetermined time period; and
said first means being operable for allowing sequential introduction of gas into the chamber for the second predetermined time period during a latter portion of said first predetermined time period.

7. A method for separating particulate materials, said method comprising:
(a) introducing a mixture of gas and particulate material into a vessel having a bottom outlet;
(b) flowing a first gas through a portion of the bottom outlet countercurrent to the flow of the particulate material as the particulate material flows from the vessel through the outlet toward a discharge valve means, for uplifting lighter particulate material back into said vessel;
(c) collecting in a portion of said discharge valve means in the bottom outlet of the vessel for a first predetermined time period, at least a heavier portion of the particulate material;
(d) sequentially injecting a second gas into the thus collected particulate material for a second predetermined time period during a latter portion of the first time period, for uplifting lighter particulate material and separating lighter particulate material from heavier particulate material; and
(e) sequentially actuating said discharge valve means, immediately after the second predetermined time period, to discharge the thus separated heavier particulate material from the bottom outlet.

8. A method as set forth in claim 7 wherein:
(a) said particulate material is collected in a generally upwardly opening chamber partially defined by the discharge valve means; and
(b) said second gas is injected into a lower disposed portion of the chamber.

* * * * *